US012545272B2

(12) United States Patent
Tsukamoto

(10) Patent No.: US 12,545,272 B2
(45) Date of Patent: Feb. 10, 2026

(54) CONTROL DEVICE

(71) Applicant: TOYOTA JIDOSHA KABUSHIKI KAISHA, Toyota (JP)

(72) Inventor: Akifumi Tsukamoto, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/602,167

(22) Filed: Mar. 12, 2024

(65) Prior Publication Data

US 2025/0033655 A1    Jan. 30, 2025

(30) Foreign Application Priority Data

Jul. 25, 2023    (JP) .................................. 2023-120532

(51) Int. Cl.
*G06F 17/00* (2019.01)
*B60W 10/00* (2006.01)
*B60W 50/08* (2020.01)

(52) U.S. Cl.
CPC .......... *B60W 50/085* (2013.01); *B60W 10/00* (2013.01); *B60W 2510/20* (2013.01)

(58) Field of Classification Search
CPC ............... B60W 50/085; B60W 10/00; B60W 2510/20; B60W 50/14; B60R 16/0231; B62D 1/046
See application file for complete search history.

(56) References Cited

U.S. PATENT DOCUMENTS

| | | | |
|---|---|---|---|
| 6,249,731 B1* | 6/2001 | Miller | B60K 28/16 340/459 |
| 9,862,340 B2* | 1/2018 | Kim | B60R 16/0373 |
| 12,118,045 B2* | 10/2024 | Ricci | G06F 21/44 |
| 2011/0087404 A1* | 4/2011 | Cieler | B60K 35/10 701/1 |
| 2012/0283894 A1* | 11/2012 | Naboulsi | A61B 5/18 701/1 |
| 2020/0180524 A1* | 6/2020 | Deschênes | H04L 41/0806 |
| 2021/0139041 A1* | 5/2021 | Blumentritt | B60W 10/18 |
| 2021/0319332 A1* | 10/2021 | Isaac | B60W 40/09 |
| 2022/0147580 A1* | 5/2022 | Ricci | H04N 21/2393 |

FOREIGN PATENT DOCUMENTS

JP        H10-308136 A       11/1998

* cited by examiner

*Primary Examiner* — Masud Ahmed
(74) *Attorney, Agent, or Firm* — SoraIP, Inc.

(57) ABSTRACT

In the control device, the identifying unit specifies, as the first vehicle function, a vehicle function having a relatively high use frequency among the vehicle functions assigned to each of the plurality of operation units mounted in the vehicle. The suggesting unit proposes to the user of the vehicle that the identified first vehicle function is assigned to a second operation unit different from the first operation unit to which the first vehicle function is assigned in advance.

7 Claims, 4 Drawing Sheets

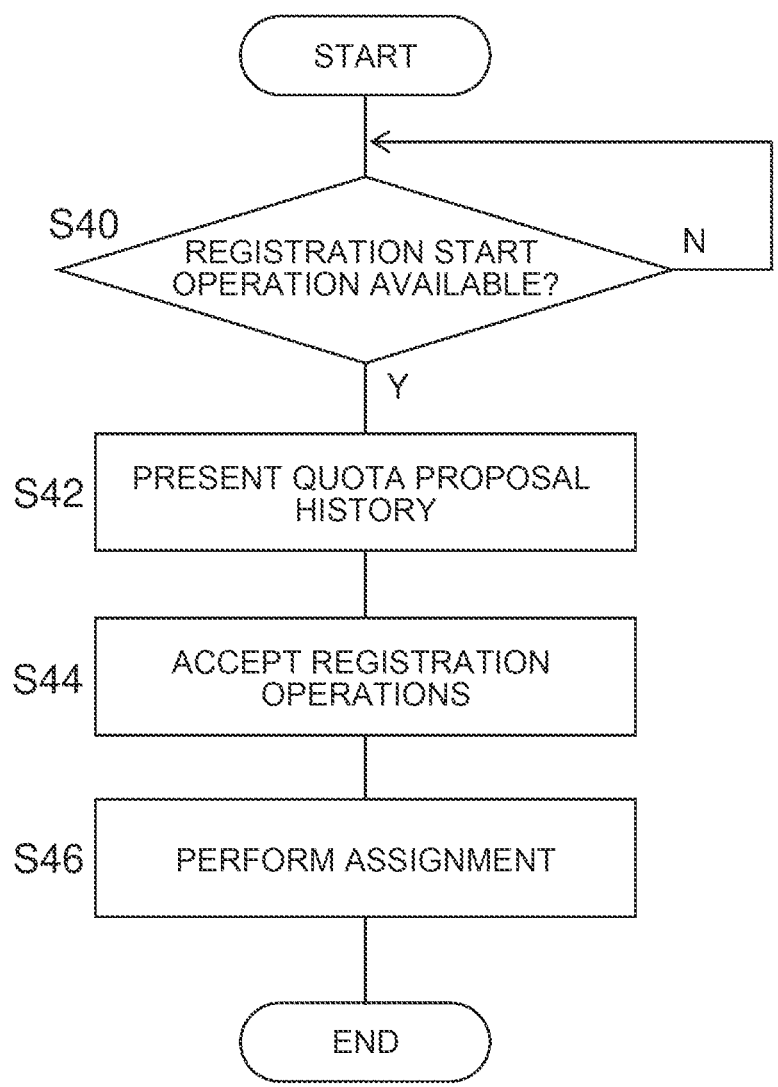

CONTROL DEVICE

CROSS-REFERENCE TO RELATED APPLICATION

This application claims priority to Japanese Patent Application No. 2023-120532 filed on Jul. 25, 2023, incorporated herein by reference in its entirety.

BACKGROUND

1. Technical Field

The present disclosure relates to a control device that assigns a vehicle function to an operation unit.

2. Description of Related Art

There is known a steering switch function assigning device that can freely assign a function to a steering switch according to driver's preferences (see, for example, Japanese Unexamined Patent Application Publication No. 10-308136 (JP 10-308136 A)). In this device, a steering switch function code to be assigned to a steering switch group can be selected from among a plurality of steering switch function codes by a user operating an operation switch.

In the technology of JP 10-308136 A, the user needs to voluntarily select a vehicle function to be assigned to the steering switch. Some users do not know which vehicle function is more convenient when assigned. Therefore, there is a possibility that the assigning function is hardly used. Therefore, there is room for improvement in usability.

SUMMARY

An object of the present disclosure is to provide a technology that can improve convenience in a control device that assigns a vehicle function to an operation unit.

In order to solve the above problem, a control device according to an aspect of the present disclosure includes:
- an identifying unit configured to identify, as a first vehicle function, a vehicle function having a relatively high use frequency among vehicle functions assigned to a plurality of operation units mounted on a vehicle; and
- a suggesting unit configured to suggest to a user of the vehicle assigning the identified first vehicle function to a second operation unit different from a first operation unit to which the first vehicle function is assigned in advance.

According to the present disclosure, it is possible to provide the technology that can improve the convenience in the control device that assigns a vehicle function to the operation unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart illustrating another process of the control device of FIG. 2.

DETAILED DESCRIPTION OF EMBODIMENTS

The control device of the embodiment records the frequency of use of a plurality of vehicle functions included in the vehicle, specifies a vehicle function having a relatively high frequency of use among the plurality of vehicle functions, and proposes to a user of the vehicle to assign the specified vehicle function to an operation unit such as a steering switch. The user is, for example, a driver of the vehicle. When a proposal is accepted by the user, the control device assigns the proposed vehicle function to the operation unit. Since a vehicle function having a relatively high frequency of use is assigned to a steering switch or the like that is easy to operate, convenience can be improved.

The operation unit of the vehicle function assignment destination candidate is, for example, an operation unit provided at a position that is easy for the user to operate. Hereinafter, an example in which the operation unit of the vehicle function assignment destination candidate is a steering switch will be described. The operation unit of the vehicle function assignment destination candidate may include an operation unit other than the steering switch.

Figure 1:
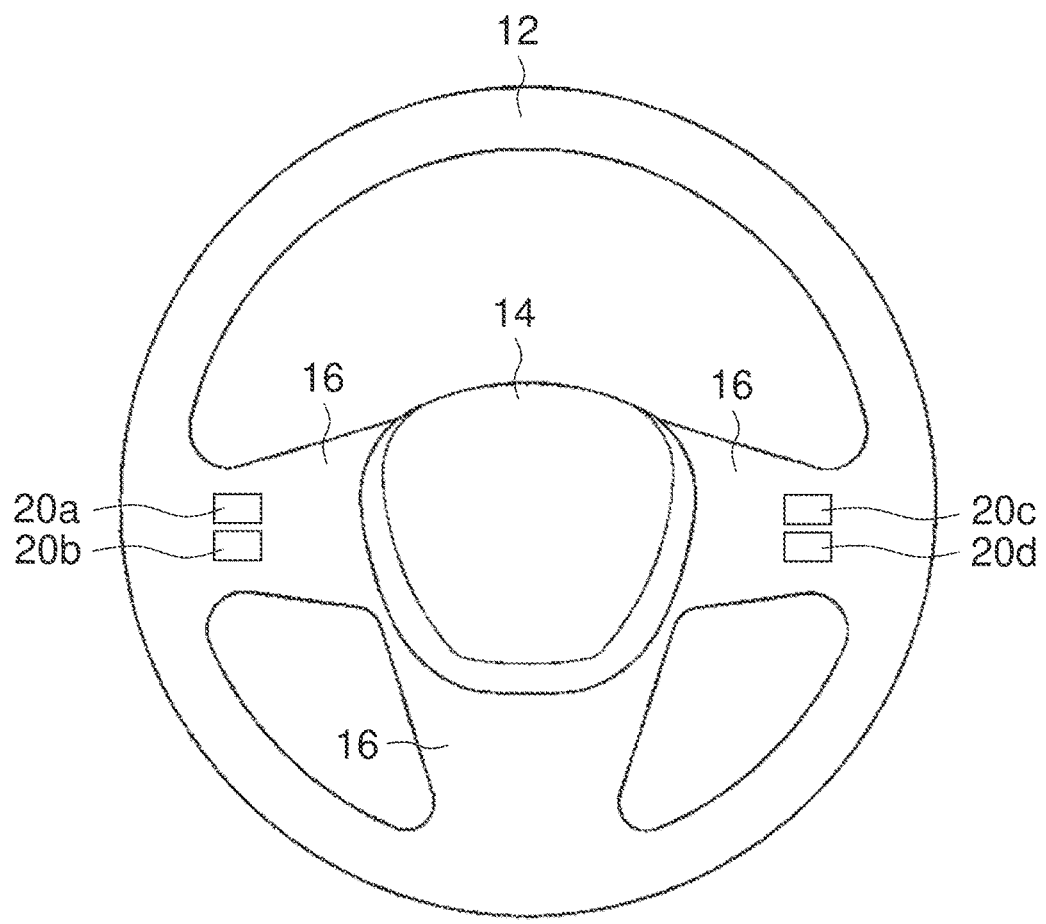
FIG. 1 is a plan view of a steering wheel according to an embodiment.

FIG. 1 is a plan view of a steering wheel 10 according to an embodiment. The steering wheel 10 is connected to a steering shaft of the vehicle and rotates by the steering of a driver who is a user of the vehicle to rotate the steering shaft. The vehicle may be an autonomous vehicle. The steering wheel 10 includes a ring portion 12, a central portion 14, a plurality of spoke portions 16, and an operation unit 20a, 20b, 20c, 20d. Hereinafter, the operation unit 20a, 20b, 20c, 20d is collectively referred to as an operation unit 20 as appropriate. The operation unit 20 may also be referred to as a steering switch. Although four operation units 20 are exemplified in the embodiment, the number of operation units 20 may be smaller than "4" or larger than "4".

The ring portion 12 is formed in an annular shape and is gripped by a driver. The central portion 14 is located at the center of the ring portion 12 and is connected to the steering shaft. The plurality of spoke portions 16 extend in the radial direction and connect the ring portion 12 and the central portion 14.

The plurality of operation units 20 are provided on the front side of the left and right spoke portions 16, respectively. The plurality of operation units 20 are disposed at positions where the driver can operate without releasing his/her hand from the ring portion 12. Therefore, the driver can easily operate the operation unit 20. For example, a vehicle function such as a control function of an audio device, a control function of an air conditioner, or a driving support function of a vehicle is assigned to each of the plurality of operation units 20 in advance. Examples of the driving assistance include Adaptive Cruise Control (ACC), Lane Keeping Assist (LKA), and the like. When the operation unit 20 is operated, a vehicle function assigned to the operated operation unit 20 is executed. The operation unit 20 can be turned on or off. The operation unit 20 may be capable of changing a set value such as a vehicle speed or a sound volume. The plurality of operation units 22 includes mechanical buttons, mechanical switches, and the like. Various known steering switches can be used as the plurality of operation units 20.

Figure 2:
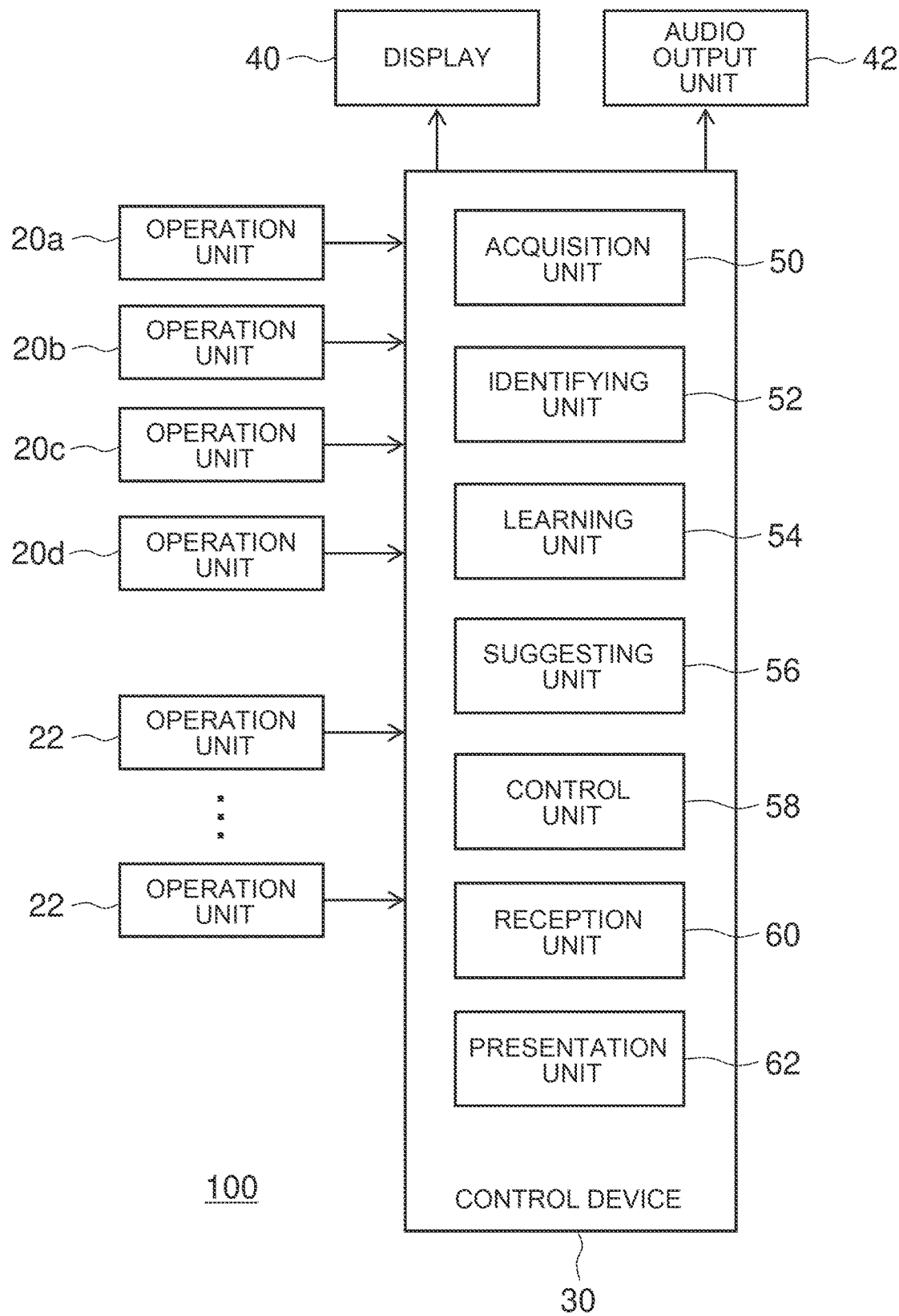
FIG. 2 is a diagram illustrating a functional configuration of a control system according to the embodiment.

FIG. 2 illustrates a functional configuration of the control system 100 according to the embodiment. The control system 100 is mounted on a vehicle. The control system 100 includes an operation unit 20*a*,20*b*,20*c*,20*d*, a plurality of operation units 22, a control device 30, a display unit 40, and an audio output unit 42.

When operated, each of the plurality of operation units 20 supplies information indicating that the operation has been performed to the control device 30. The control device 30 can change the vehicle function assigned to each of the plurality of operation units 20. The plurality of operation units 20 are operation units of candidate assignment destinations of vehicle functions.

The plurality of operation units 22 are operation units other than the steering switch. A vehicle function is assigned to each of the plurality of operation units 22 in advance. The vehicle function assigned to the operation unit 20 in advance is also assigned to the operation unit 22. The vehicle function includes, for example, a control function of the audio device, a control function of the air conditioner, a driving support function of the vehicle, an opening and closing function of the power window, a hazard function, a wiper function, and the like. As such, the plurality of operation units 22 includes power window switches, hazard switches, wiper switches, and the like. The plurality of operation units 22 includes a mechanical button, a mechanical switch, a button displayed as an image on the display unit 40, a touch panel type sensor corresponding to the switch, and the like. Various known operation units can be used as the operation unit 22.

The plurality of operation units 22 are operation units that are not candidates to which the vehicle function is assigned. That is, the control device 30 cannot change the vehicle function assigned to each of the plurality of operation units 22. Note that, as described above, a part of the plurality of operation units 22 may be an operation unit of an assignment destination candidate of a vehicle function. For example, a touch panel type sensor corresponding to a predetermined button or switch displayed as an image on the driver's seat side of the center display that is the display unit 40 may be an operation unit of a candidate assignment destination of a vehicle function. The operation unit 22 at this position is also an operation unit provided at a position that is easy for the user to operate.

When operated, each of the plurality of operation units 22 supplies information indicating that the operation has been performed to the control device 30.

The display unit 40 includes, for example, a touch display provided in a vehicle cabin, and includes a liquid crystal panel or an organic EL panel. The display unit 40 may be, for example, a center display capable of displaying an image such as car navigation.

The audio output unit 42 includes a speaker that outputs sound provided in the vehicle cabin.

The control device 30 includes an acquisition unit 50, an identifying unit 52, a learning unit 54, a suggesting unit 56, a control unit 58, a reception unit 60, and a presentation unit 62. The configuration of the control device 30 may be realized by hardware, a CPU of any computer, a memory, or any other LSI, and may be realized by software, a program loaded into the memory, or the like. Therefore, it is understood by those skilled in 10 the art that these functional blocks can be implemented in various forms by hardware only, by software only, or by a combination of hardware and software.

The acquisition unit 50 acquires the use frequencies of the plurality of vehicle functions and the use frequencies of the plurality of operation units 20 in a predetermined target period based on the operation information of the plurality of operation units 20 and the plurality of operation units 22.

The acquisition unit 50 supplies the acquired information to the identifying unit 52. The use frequency is determined based on, for example, the number of times of use in a period in which the ignition switch is turned on. The predetermined target period may be, for example, about several tens of hours, and May be appropriately determined by experiment or simulation.

The identifying unit 52 specifies, as the first vehicle function, a vehicle function having a relatively high use frequency among the plurality of vehicle functions based on the received use frequencies of the plurality of vehicle functions. The identifying unit 52 specifies, as the second vehicle function, a vehicle function having a high frequency of use next to the first vehicle function among the plurality of vehicle functions.

The identifying unit 52 specifies the first vehicle function and the second vehicle function by excluding the proposed vehicle function that has been rejected a predetermined number of times by the user in the past. The predetermined number of times may be "1" or more, and may be appropriately determined by experiment or simulation. In this way, it is not possible to propose to assign a vehicle function that is highly likely to be rejected.

The identifying unit 52 further excludes the vehicle functions assigned to the plurality of assignment destination candidates operation units 20, and specifies the first vehicle function and the second vehicle function. For example, the identifying unit 52 specifies, as the first vehicle function, a vehicle function having the highest frequency of use among a plurality of vehicle functions excluding the control function of the audio device assigned to the operation unit 20, the control function of the air conditioner, and the like.

In a vehicle function having a relatively high usage frequency, if the usage frequency is lower than a predetermined frequency threshold, the identifying unit 52 may not specify the vehicle function as the first vehicle function. The frequency threshold value is, for example, once every 10 hours, and can be determined as appropriate by experiment or simulation. In this way, it is possible to make it possible not to propose to assign a vehicle function that is hardly used. In this case, the acquisition unit 50 acquires, for example, the frequency of use of the plurality of vehicle functions in the next predetermined target period.

Hereinafter, an example in which the first vehicle function is a hazard function and the second vehicle function is an opening/closing function of a power window will be described.

The identifying unit 52 specifies the operation unit 20 having a relatively low usage frequency among the operation units 20 of the plurality of assignment destination candidates as the second operation unit. For example, the identifying unit 52 specifies the operation unit 20*c* as the second operation unit when the user frequently uses the operation unit 20*a* and the operation unit 20*b* but hardly uses the operation unit 20*c* and the operation unit 20*d*.

The identifying unit 52 supplies the identified information on the first vehicle function, the second vehicle function, and the information on the second operation unit to the suggesting unit 56.

The learning unit 54 acquires the operation information of the vehicle, and performs machine learning in advance of a timing suitable for a proposal to the user (hereinafter, also referred to as a proposal timing) based on the acquired operation information. The learned suggestion timing may vary from user to user. The operation information of the vehicle includes operation information of the operation unit 20 and the operation unit 22, and operation information related to the driving operation. The operation information related to the driving operation includes operation information such as an ignition switch, an accelerator pedal, a brake pedal, a shift lever, and a parking brake.

When the next operation is not executed for a predetermined time or longer after one or more specific operations are executed, the learning unit 54 may learn that the time when the specific operation is executed is a timing suitable for a proposal to the user. The fixed time period may be, for example, several tens of seconds to several minutes, and may be appropriately determined by experiment or simulation. The learning unit 54 may perform machine learning on a model for estimating that the timing is the proposal timing.

For example, when the user tends not to perform any vehicle operation for a period of several tens of seconds to several minutes after turning on the ignition switch, the learning unit 54 may learn that the timing when the ignition switch is turned on is a timing suitable for proposing to the user. In this case, after the ignition switch is turned on, the user may not feel the proposal troublesome and may easily consider whether to accept the proposal.

Further, for example, when the user has set the shift lever from the drive position to the parking position and then tends not to perform any vehicle operation for a period of several tens of seconds to several minutes, the learning unit 54 may learn that the time when the shift lever is set from the drive position to the parking position is a timing suitable for a proposal to the user. In this case, there is a possibility that the user has set the shift lever to the parking position because it is considered that a relatively long stop time is reached due to waiting for a signal or the like. There is a possibility that the user does not feel the proposal troublesome, and it is easy to consider whether the proposal is accepted.

The suggesting unit 56 proposes to the user of the vehicle that, at the proposal timing, the identified first vehicle function is assigned to a second operation unit different from the first operation unit to which the first vehicle function is assigned in advance. The suggesting unit 56 proposes via at least one of the display unit 40 and the audio output unit 42.

The proposal timing includes a predetermined proposal timing and a proposal timing learned by the learning unit 54. The predetermined proposal timing is a timing not dependent on the user, and is a timing not related to the learning result by the learning unit 54. The predetermined proposal timing is, for example, a timing at which the ignition switch of the vehicle is turned off. When the ignition switch is turned off, the user is less likely to feel the proposal troublesome, and it is easy to consider whether the proposal is accepted.

The display unit 40, for example, "Hazard functions are frequently used. The suggestion "Don't you assign the hazard function to the steering switch C?" may be displayed in letters. The audio output unit 42 may output the proposal by audio. It is assumed that the "steering switch C" represents the operation unit 20*c*. The display unit 40 may display an image indicating the position of the second operation unit. Thus, the position of the second operation unit can be easily grasped by the user.

As described above, since it is proposed to assign the vehicle function to the operation unit 20 having a relatively low use frequency among the plurality of operation units 20, it is possible to make a proposal that is relatively highly likely to be accepted by the user. The user may be able to efficiently use each of the plurality of operation units 20. The user does not need to grasp the operation unit 20 that is not used, and is highly convenient. Since it is not proposed to assign a vehicle function to the operation unit 20 having a relatively high operation frequency, it is possible to suppress a proposal that is highly likely to reduce convenience when accepted.

When the proposal is made, the reception unit 60 accepts an operation input indicating acceptance or rejection of the proposal by the user. This operation input may be an operation input to a touch panel type sensor corresponding to an image of an accept button or a reject button displayed on the display unit 40. The operation input may be an operation input by a user's voice via a microphone in a vehicle cabin (not shown).

When the reception unit 60 accepts an operation input indicating that the proposal is accepted, that is, when the proposal is accepted by the user, the control unit 58 assigns the first vehicle function to the second operation unit. That is, the control unit 58 changes the vehicle function assigned to the second operation unit to the first vehicle function. When the second operation unit is operated after the allocation change, the control unit 58 supplies information indicating that the second operation unit is operated to a control device such as an Electronic Control Unit (ECU) corresponding to the first vehicular function. Therefore, when the operation unit 20*c* corresponding to the second operation unit is operated, the hazard function is executed instead of the driving support function. When the proposal is accepted by the user, the control unit 58 does not change the assignment of the first operation unit to which the first vehicle function is assigned in advance. Therefore, even when the hazard switch, which is the first operation unit, is operated, the hazard function is executed.

When the reception unit 60 receives an operation input indicating that the proposal is rejected, or when the reception unit 60 does not receive an operation input indicating that the proposal is accepted for a predetermined period of time, that is, when the proposal is rejected by the user, the control unit 58 does not assign the first vehicle function to the second operation unit. That is, the control unit 58 does not change the vehicle function assigned to the second operation unit. The predetermined period of time can be appropriately determined by experiment or simulation.

If the proposal regarding the first vehicle function is rejected by the user and the rejected number of times is less than the predetermined number of times, the suggesting unit 56 proposes again to the user to assign the first vehicle function to the second operation unit at the next proposal timing. If the predetermined number of times is "2", the same proposal is executed again even if it is rejected once, for example, if the user turns on the ignition switch and then turns off. Thus, even when the user rejects the first proposal due to an operation error, the same proposal is made, and thus the convenience is high.

If the proposal regarding the first vehicle function is rejected a predetermined number of times by the user, the suggesting unit 56 does not execute the proposal regarding the first vehicle function again. This makes it difficult for the user to feel troublesomeness. If the proposal regarding the first vehicle function is rejected a predetermined number of times by the user, the suggesting unit 56 newly proposes to the user that the identified second vehicle function is assigned to a second operation unit different from the third operation unit to which the second vehicle function is assigned in advance. The suggesting unit 56 proposes a new allocation without waiting until the next proposal timing.

For example, when the predetermined number of times is "2", when the user rejects the proposal regarding the hazard function twice, the suggesting unit 56 proposes to assign, following the second proposal, the opening and closing function of the power window that is frequently used next to the operation unit 20c that is a second operation unit that differs from the power window switch that is the third operation unit. As a result, the user's selection range can be widened, and convenience can be improved.

When the reception unit 60 accepts an operation input indicating that the proposal regarding the second vehicle function is accepted, the control unit 58 assigns the second vehicle function to the second operation unit.

When the user rejects the proposal regarding the second vehicle function, the control unit 58 does not assign the second vehicle function to the second operation unit. If the proposal regarding the second vehicle function is rejected by the user and the rejected number of times is less than the predetermined number of times, the suggesting unit 56 proposes again to the user to assign the second vehicle function to the second operation unit at the next proposal timing. If the proposal regarding the second vehicle function is rejected a predetermined number of times by the user, the suggesting unit 56 does not execute the proposal regarding the second vehicle function again.

Note that the reception unit 60 may accept an operation input by the user to designate the operation unit 20 of the assignment destination candidate to be excluded. In this case, the identifying unit 52 may exclude the operation unit 20 of the assignment destination candidate designated by the user from the operation unit 20 of the plurality of assignment destination candidates, and specify the operation unit 20 having a relatively low operation frequency among the operation units 20 of the remaining plurality of assignment destination candidates as the second operation unit.

For example, the user is an operation unit 20 to be always used although the use frequency is low, it is possible to specify the operation unit 20 that does not want to change the assignment of the vehicle functions. Alternatively, for example, the user may designate the operation unit 20 that is located at a position that is difficult to be operated by the gripping method of the steering wheel 10 of the user and that is not intended to be used, and that is the operation unit 20. Accordingly, it is possible to make an appropriate proposal in accordance with the usage status of the user.

Further, the reception unit 60 may accept an operation input by the user to designate a vehicle function to be excluded from the assignment. In this case, the identifying unit 52 may exclude the vehicle function designated by the user from the plurality of vehicle functions, and specify the first vehicle function and the second vehicle function from the remaining plurality of vehicle functions.

For example, the user can designate a vehicle function assigned in advance to a specific operation unit 22 at a position that is easy for the user to operate. This is because such a vehicle function is less required to be assigned to a steering switch. This makes it possible to make an appropriate proposal tailored to the user.

Incidentally, the reception unit 60 can also accept an operation input for starting the registration of the vehicle function by the user. The registration start of the vehicle function means that a process of assigning the vehicle function selected voluntarily by the user to the operation unit 20 selected by the user is started.

When the reception unit 60 receives an operation input for starting registration of a vehicle function, the presentation unit 62 presents a proposal history of past assignment to the user via the display unit 40. The past proposal history includes a proposal of an assignment rejected by the user and a proposal of an assignment accepted by the user. The presentation unit 62 also presents information indicating whether each of the one or more proposals is rejected or accepted.

When the presentation unit 62 presents the proposal history, the reception unit 60 receives an operation input for registering the vehicle function. The operation input for registering the vehicle function is an operation input for designating the vehicle function and the operation unit 20 to which the vehicle function is assigned. When the reception unit 60 accepts an operation input for registering a vehicle function, the control unit 58 assigns the vehicle function designated by the operation input to the designated operation unit 20.

Since the user can confirm the proposal history of the past assignment, it is easy to examine which vehicle function is assigned to the operation unit 20. For example, since a vehicle function in which a user has rejected a proposal in the past is frequently used, there is a possibility that the user desires to assign the vehicle function.

Figure 3:
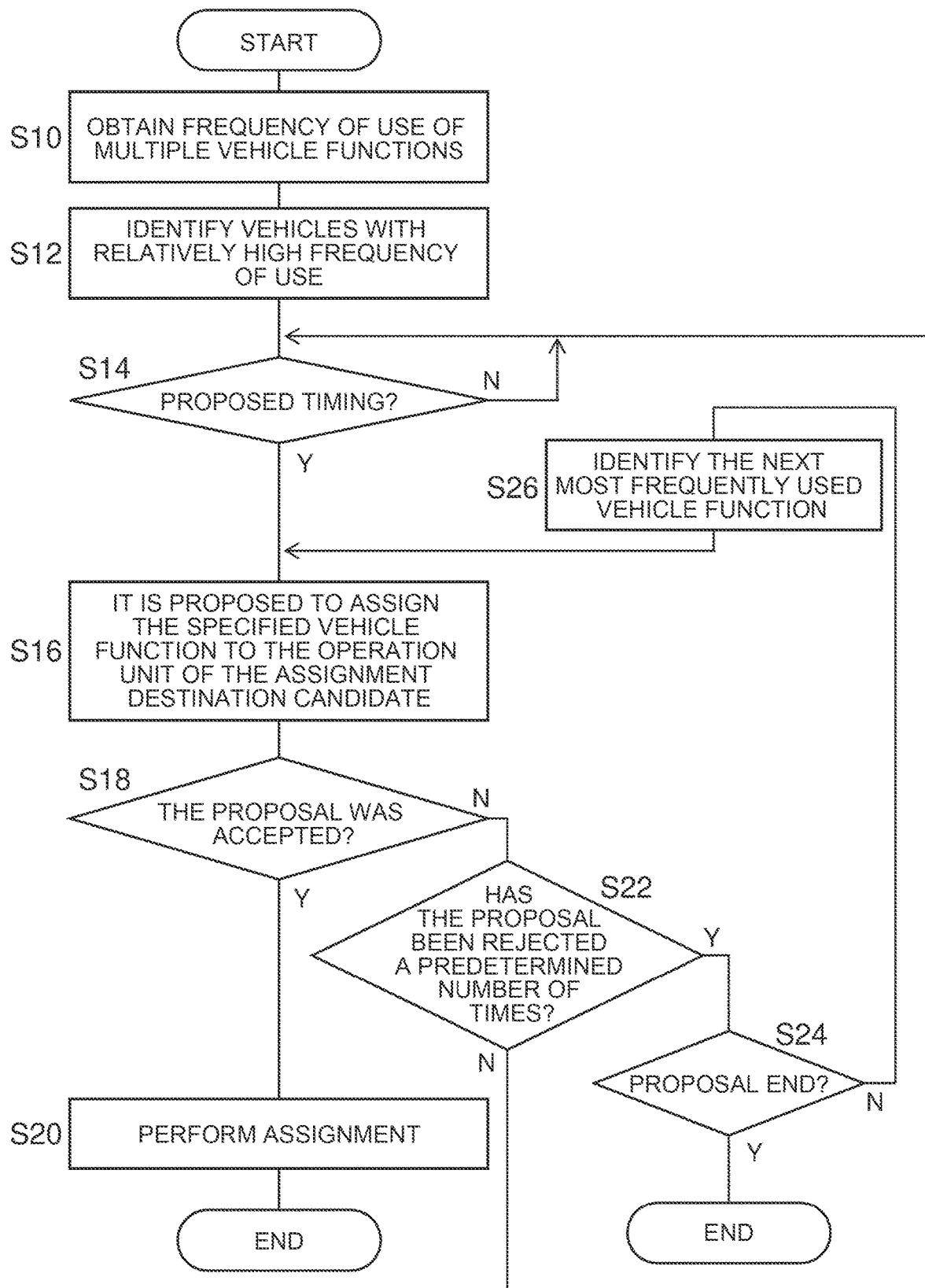
FIG. 3 is a flow chart showing the process of the control device of FIG. 2.

Next, an overall operation of the control system 100 having the above-described configuration will be described. FIG. 3 is a flowchart showing a process of the control device 30 of FIG. 2.

The control device 30 acquires the frequency of use of a plurality of vehicle functions (S10), and identifies a vehicle function having a relatively higher frequency of use (S12). As described above, S12 excludes, for example, the proposed vehicular function that has been rejected by the user a predetermined number of times. The control device 30 determines whether the timing is the suggestion timing (S14). If not (N in S14), the control device 30 returns to S14 process. When the timing is the proposal timing (Y in S14), the control device 30 proposes to the user to assign the specified vehicular function to the operation unit 20 of the assignment destination candidate (S16).

If the suggestion is accepted (Y in S18), the control device 30 performs the allocation (S20) and ends the process. If the proposal is not accepted (N in S18), if the proposal has not been rejected a predetermined number of times (N in S22), the control device 30 returns to S14 process. If the proposal is rejected a predetermined number of times (Y in S22), if the proposal termination condition is not satisfied (N in S24), the control device 30 then identifies a vehicle function that is frequently used (S26) and returns to S16. The proposal end condition is, for example, that a predetermined number of proposals regarding vehicle functions have been made. The predetermined number may be, for example, two or more. If the proposed termination condition is satisfied (Y in S24), the control device 30 terminates the process.

FIG. 4 is a flowchart illustrating another process of the control device 30 of FIG. 2. The processing of FIG. 4 is executed in parallel with the processing of FIG. 3.

The control device 30 determines whether or not there is a registration start operation (S40), and if there is no registration start operation (N in S40), returns to S40 process. When there is a registration initiation operation (Y in S40), the control device 30 presents a proposal history of allocation to the user (S42), and accepts a registration operation by the user (S44). The control device 30 performs allocation in response to the registering operation (S46), and ends the process.

According to the embodiment, since it is proposed to the user to assign a vehicle function having a relatively high usage frequency to the operation unit 20, it is possible to make a proposal that is easy for the user to accept. The user can assign a highly convenient vehicle function suited to his/her preference to the operation unit 20 at a position that is easier for the user to operate without knowing the usage tendency of his/her vehicle function. Therefore, the convenience can be improved.

The present disclosure has been described with reference to the embodiments. The embodiment is merely an example. Various modifications of the respective components and the combinations of the respective processing processes are possible. Such variations are also within the scope of the present disclosure.

For example, the control device 30 may not include the learning unit 54. In this case, the processing can be simplified.

Further, the acquisition unit 50 may have a learning function by AI (artificial intelligence). The frequency of use of the plurality of vehicular functions and the frequency of use of the operation units 20 of the plurality of allocation destination candidates may be learned by AI.

Further, if the second operation unit is not used for a certain period of time after the control unit 58 assigns the first vehicle function or the second vehicle function to the second operation unit, the acquisition unit 50 may newly acquire the use frequency, and the identifying unit 52 may newly specify the first vehicle function. Then, the suggesting unit 56 may newly propose to assign the newly identified first vehicle function to the second operation unit. The period of time may be determined as appropriate by experiment or 10 simulation. In this modification, when the second operation unit is not used for some reason, there is a possibility that convenience can be improved by making a new proposal.

What is claimed is:

1. A control device comprising:
a processor configured to:
identify, as a first vehicle function, a vehicle function having a relatively high use frequency among vehicle functions assigned to a plurality of operation units mounted on a vehicle;
suggest assigning the identified first vehicle function to a second operation unit to a user of the vehicle, the second operation unit being different from a first operation unit to which the first vehicle function is assigned;
assign the first vehicle function to the second operation unit when suggestion is accepted by the user, wherein the processor is further configured to:
(i) identify, as the second operation unit, an operation unit having a relatively low use frequency among a plurality of candidate operation units mounted on the vehicle, and
(ii) identify, as a second vehicle function, a vehicle function having a highest use frequency next to the first vehicle function among the vehicle functions; and
in a case where the suggestion of assigning the first vehicle function is rejected a predetermined number of times by the user, the processor suggests assigning the identified second vehicle function to the second operation unit to the user, the second operation unit being different from a third operation unit to which the second vehicle function is assigned.

2. The control device according to claim 1, wherein the second operation unit is a steering switch of the vehicle.

3. The control device according to claim 1, wherein the processor is further configured to
learn a timing suitable for suggestion to the user based on operation information of the vehicle, wherein the suggesting unit is configured to offer the suggestion to the user at the learned timing suitable for the suggestion.

4. The control device according to claim 3, wherein
the timing suitable for the suggestion is when an ignition switch of the vehicle is turned on.

5. The control device according to claim 3, wherein
the timing suitable for the suggestion is when a shift lever of the vehicle is changed to a parking position.

6. The control device according to claim 1, wherein the processor is further configured to
determine the use frequency of the vehicle functions based on the number of times each vehicle function used during a period in which an ignition switch of the vehicle is turned on.

7. The control device according to claim 1, wherein the processor is further configured to
determine the use frequency of the operation units based on the number of times each operation unit used during a period in which an ignition switch of the vehicle is turned on.

* * * * *